INVENTORS
Raymond F. Nixon, &
BY Addison S. Prout
Barnard, McGlynn & Reising
ATTORNEYS INVENTORS
Raymond F. Nixon, &
BY Addison S. Prout
Barnard, McGlynn & Reising
ATTORNEYS INVENTORS
Raymond F. Nixon, &
BY Addison S. Prout Barnard, McGlynn & Reising
ATTORNEYS

United States Patent Office 3,608,248
Patented Sept. 28, 1971

3,608,248
FORM RELIEVING APPARATUS
Raymond F. Nixon, Bloomfield Hills, and Addison S. Prout, Orchard Lake, Mich., assignors to Omark-Winslow Aerospace Tool Co., Arcadia, Calif.
Filed Feb. 4, 1969, Ser. No. 796,442
Int. Cl. B24b 19/00, 47/10
U.S. Cl. 51—225
13 Claims

ABSTRACT OF THE DISCLOSURE

Form relieving apparatus including a workpiece supporting carriage non-rotatably and rectilinearly movably mounted on a base, and actuating means operable to reciprocate the carriage relative to the base along either selected one of two transverse paths or along any selected path extending between the transverse paths and through the intersection thereof. The actuating means includes adjustment means for selectively varying the distance moved by the carriage along its selected path. The actuating means comprises a pair of levers engaged with the carriage each operable to move the carriage along one of the transverse paths. The levers are operated by a rotatable cam mounted on the carriage.

---

This invention relates generally to grinding apparatus for manufacturing rotary products such as cutting tools, for example, drills, reamers and the like, and is particularly concerned with apparatus for supporting a drill bit or similar workpiece for movement relative to a grinding wheel for relieving operations so as to provide a desired amount of axial or radial relief, or both, for the bit.

Rotary cutting tools such as drilling and reaming bits must be provided for a wide variety of specialized operations, and for forming a wide variety of sizes and shapes of holes. Such bits usually have alternating lands and flutes, the leading edges of the lands comprising cutting edges which perform a cutting operation during rotation of the tool. The lands must be relieved radially in back of the cutting edges, so that they do not drag against the wall of the hole being drilled. Moreover, this relief must extend along a length corresponding to the cutting depth of the tool. It is frequently necessary to provide holes having stepped diameters requiring a drill having a small diameter at its end portion which is followed by a large diameter portion. It is therefore necessary to relieve a drill having the large diameter in both axial and radial directions to form the small diameter end portion. This is normally done by mounting the drill in a form relieving apparatus having a spindle for rotatably supporting the workpiece, and a movable carriage or the like operated by motion transmitting mechanism to cause the carriage to oscillate in either an axial or radial direction, or both, to move the rotating workpiece toward and away from the grinding wheel. Examples of prior art form relieving devices are disclosed in U.S. Pats. 2,471,-539 and 2,752,740.

In one such prior art device, a sub-carriage is mounted on a stationary base for rectilinear movement in a radial direction to move the workpiece radially with respect to a grinding wheel, and a super carriage is mounted on the sub-carriage for rectilinear movement in a longitudinal or axial direction to move the workpiece axially with respect to the grinding wheel. Supported on the super carriage is a work holding spindle, and a cam is mounted on the spindle in engagement with a stationary cam follower mounted on the base such that rotation of the cam causes the super carriage to reciprocate in the axial direction. The super carriage also is engageable with a sine bar mounted on the base and which is angularly adjustable. When the sine bar projects angularly inwardly toward the axis of the spindle, the axial movement caused by rotation of the cam causes the super carriage to react against the sine bar as it moves in an axial direction, which in turn causes the sub-carriage to move in a radial direction due to the action of the sine bar against the super carriage. As the angle of the sine bar is increased, however, the resistance of the device to axial movement is likewise increased, and the forces are such that it is not practical to position the sine bar at an angle of more than about 45° relative to the longitudinal axis of the spindle. Moreover, it is not possible with such apparatus to provide only radial relief since radial movement of the spindle can take place only in combination with axial movement of the spindle.

In another such prior art device, the work holding spindle is mounted on a carriage which is slidably supported on a slide disk, the slide disk in turn being rotatably mounted on a base. The carriage is maintained in position on the slide disk by a pair of slide bars extending through slideways carried by the slide disk. The spindle is rotatably supported on the carriage. When the slide bars are disposed in parallel relationship with the longitudinal axis of the spindle, the spindle can be reciprocated solely in an axial direction by reciprocating the carriage relative to the slide disk. By rotating the slide disk 90°, the spindle can be reciprocated solely in a radial direction by reciprocating the carriage relative to the slide disk. To provide both axial and radial relief, the slide disk is rotated to an intermediate position relative to the base and to the longitudinal axis of the spindle. Reciprocation of the spindle is provided by a bell crank lever which has one arm engaged with an edge of a cam mounted on the spindle and its other arm engaged with the rear face of the cam such that rotation of the cam causes the bell crank lever to oscillate and, acting through the rear face of the cam, cause the carriage to reciprocate relative to the slide disk. However, as the angle between the slide bars and the spindle longitudinal axis increases, greater and greater force is required to be applied to the rear face of the cam in order to provide a component of force in the direction of the slide bars sufficient to move the spindle. In many instances, when the angle between the spindle and the slide bars is greater than about 45°, the mechanism will bind and will require locking the bell crank against pivotal movement so that reciprocation of the spindle is obtained by reaction of the edge of the cam against the now fixed, or immovable lever.

In both prior art devices described in the preceding paragraphs, it is difficult to obtain all combinations of axial and radial movement of the work holding spindle, and adjustment of both devices to obtain different amounts of radial and axial relief, or both, is cumbersome. In the first device mentioned above, the cam must be exchanged in order to obtain a different amount of axial relief, and it is not possible to obtain radial relief only. In the second device, the spindle must be rotatably adjusted relative to the carriage, and the carriage must be rotatably adjusted relative to the base.

It is therefore an object of this invention to provide form relieving apparatus having a carriage for supporting a workpiece holding spindle, the carriage being movably mounted on a base, that can be adjusted to provide varying amounts of axial and radial movement of the carriage relative to the base without exchanging parts, or without adjusting or reorienting the carriage relative to the base.

Another object is to provide form relieving apparatus having actuating mechanism operable to provide radial relief only, axial relief only, or any combination of axial and radial relief.

Still another object is to provide apparatus for supporting a workpiece for movement relative to a grinding wheel having a base with a workpiece supporting carriage non-rotatably and rectilinearly movably mounted on the base with actuating means operable to reciprocate the carriage relative to the base along either selected one of two transverse paths or along any selected path extending between the transverse paths and through the intersection thereof.

Still another object is to provide apparatus for supporting a workpiece for movement relative to the grinding wheel including a base with a slide member mounted on the base for rectilinear movement relative to the base along a first path, a carriage mounted on the slide member for rectilinear movement relative to the slide member along a second path in non-parallel relationship with the first path, and having actuating means interacting between the base, slide member and carriage operable to selectively reciprocate the slide member along the first path without moving the carriage relative to the slide member, reciprocate the carriage relative to the slide member along the second path without moving the slide member relative to the base, or simultaneously reciprocate the slide member relative to the base and the carriage relative to the slide member.

A further object is to provide apparatus for supporting a workpiece for movement relative to a grinding wheel having a base with a workpiece supporting carriage movably mounted on the base wherein a first lever engaged with a carriage is operable to move the carriage in a first direction relative to the base and a second lever engaged with the carriage is operable to move the carriage in a second direction relative to the base.

A still further object is to provide apparatus for supporting a workpiece for movement relative to a grinding wheel having a base with a workpiece supporting carriage movably mounted on the base with first actuating means engaged with the carriage and operable to move the carriage in a first path relative to the base, and second actuating means engaged with the carriage operable independently of the first actuating means to move the carriage relative to the base in a second path transverse to the first path, said first and second actuating means being simultaneously operable to cause the carriage to move in a path lying between and passing through the intersection of the first and second paths.

The foregoing, and other objects, are achieved by the provision of apparatus having a base with a workpiece supporting carriage or carriage member non-rotatably and rectilinearly movably mounted on the base and actuating means operable to reciprocate the carriage relative to the base along either selected one of two transverse paths or along any selected path extending between said transverse paths and through the intersection thereof. The actuating means includes adjustment means for selectively varying the distance moved by the carriage along its selected path.

In the preferred embodiment, a cross-slide member is mounted on the base for rectilinear movement relative to the base along a first path and the workpiece carriage, or axial-slide member, is mounted on the cross-slide member for rectilinear movement relative to the cross-slide member along a second path transverse to the first path. The actuating means interacts between the base, cross-slide member and carriage and is operable to selectively reciprocate the cross-slide member along the first path without moving the carriage relative to the cross-slide member, reciprocate the carriage relative to the cross-slide member along the second path without moving the cross-slide member relative to the base, or simultaneously reciprocate the cross-slide member relative to the base and the carriage relative to the cross-slide member. The actuating means includes a first lever interacting between the base and carriage to reciprocate the cross-slide member and carriage along the first path relative to the base, and a second lever interacting between the cross-slide member and carriage for reciprocating the carriage along the second path relative to the slide member. Each of the levers is provided with an arm of adjustable effective length to selectively vary the distance moved by the carriage along its selected path. The levers are each engaged with a cam carried by the spindle so that rotation of the cam causes oscillation of the levers to in turn cause reciprocation of the carriage along the path determined by the position of the fulcrums of the levers relative to the motion transmitting points of the levers. Adjustment is provided such that the fulcrum point of either lever can effectively coincide with the operative end of a motion transmitting arm of the lever, i.e. so that the lever arm length is effectively reduced to zero, whereupon oscillation of the lever will transmit no movement to the carriage. Consequently, with one lever thus made inactive, the carriage can be reciprocated solely along one of the transverse paths relative to the base. Thus, if the lever operable to move the carriage in a radial direction relative to the base is deactivated, operation of the other lever will cause axial movement only of the carriage relative to the base. Similarly, the carriage can be made to reciprocate solely in a radial direction to provide radial relief only by deactivating the lever operable to move the carriage in an axial direction.

Other objects, advantages and features of the invention will become apparent from the following description taken in connection with the accompanying drawings in which:

FIG. 1b is an end view, on the sheet with FIG. 6, of the bit of FIG. 1a taken on line 1b—1b of FIG. 1a;

Figure 1:
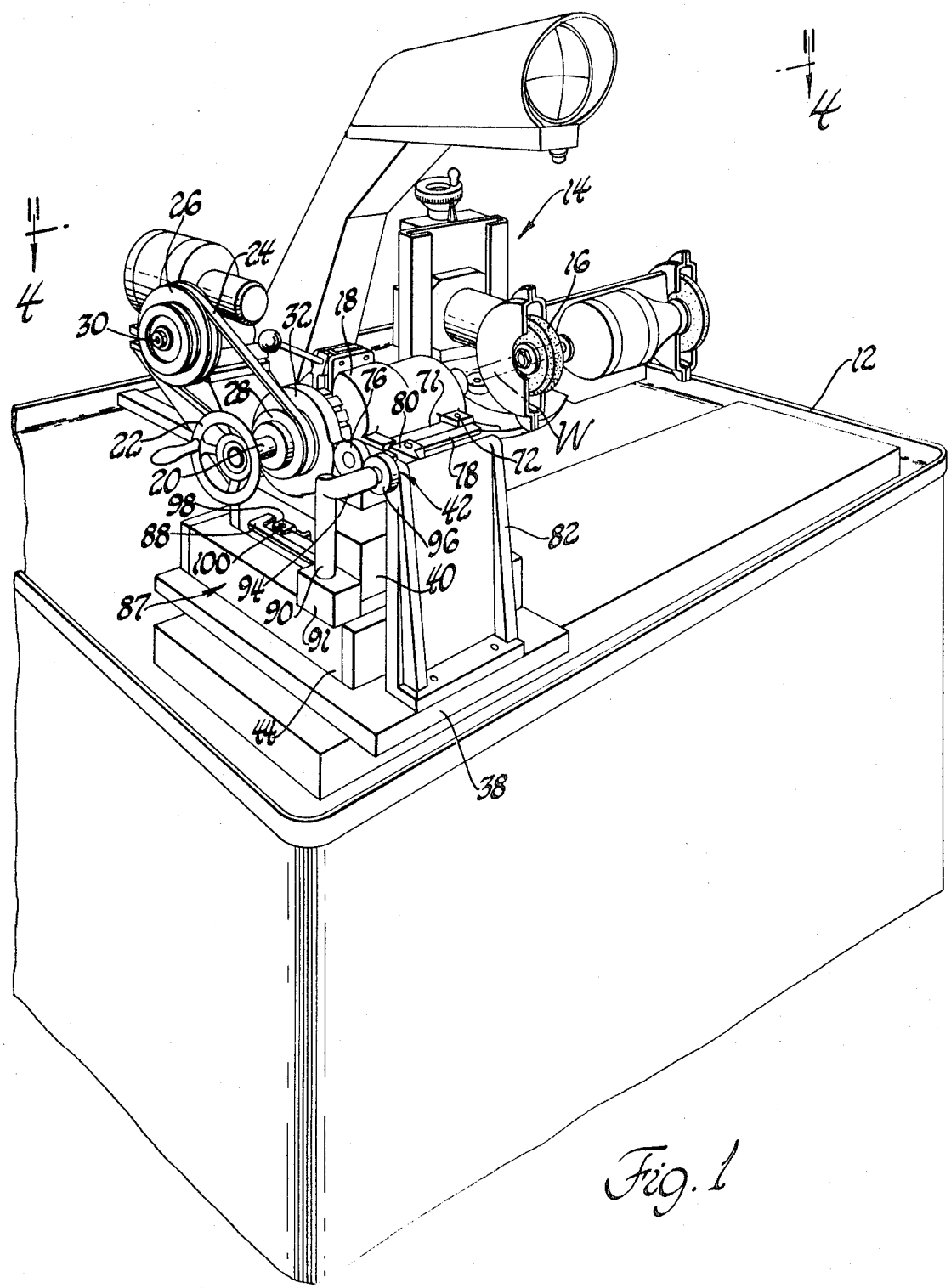
FIG. 1 is a perspective view of form relieving apparatus embodying the present invention.
Figure 1A:
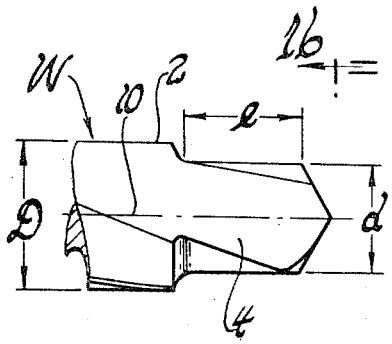
FIG. 1a is a detailed view, on the sheet with FIG. 6, of one end of a drilling bit.
Figure 1B:
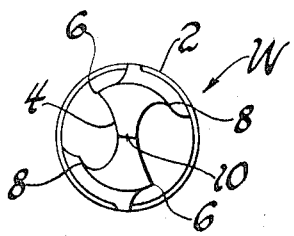

FIGS. 1a and 1b illustrate a workpiece W in the form of a drilling bit having helical lands 2 and flutes 4 having a major diameter D. A typical problem is to provide a reduced diameter portion on the end of the workpiece W having a diameter $d$ to provide a stepped diameter drill. In order to carry out drilling and cutting operations, the cutting edges 6 of the lands of the small diameter portion must be further from the rotary axis 10 than the trailing edges 8 so that the trailing edges will not drag against the wall of the hole being drilled by the bit W. Thus, the outer surface of the small diameter portion must be relieved over the axial length $l$, and in a radial direction such that the radius from the axis 10 to the trailing edges 8 is less than the radial distance from the axis 10 to the cutting edges 6. The usual procedure is to first spin grind or circular grind the small diameter portion to the diameter $d$ and then relief grind the small diameter end portion.

With reference to FIG. 1, reference numeral 12 designates a table for supporting a conventional grinding machine 14 having a grinding wheel 16. The workpiece W is mounted in a spindle 20 having a housing 18. Hand wheel 22 is mounted on the end of the spindle opposite the workpiece W for manually rotating the spindle. Spindle 20 may be driven by conventional means such as by a drive belt 24 mounted on pulleys 26 and 28. Pulley 28 is mounted on spindle 20, and pulley 26 is mounted on the output shaft 30 of a motor or gear box. A cam 32 is non-rotatably mounted on spindle 20 for a purpose to be set forth below.

In accordance with the present invention, the workpiece W and the workpiece holding spindle 20 is supported for movement relative to grinding wheel 16 on form relieving apparatus comprising a base 38; a workpiece supporting carriage or carriage member 40 non-rotatably and rectilinearly movably mounted on base 38; and actuating means designated collectively by reference numeral 42 operable to reciprocate carriage 40 relative to base 38 along either selected one of two transverse paths or along any selected path extending between said transverse paths and through the intersection thereof. As pointed out hereinbelow, the actuating means 42 includes adjustment means for selectively varying the distance moved by carriage 40 along the selected path.

Carriage 40, which is an axial slide member, is mounted on the base member 38 by means of a cross-slide member 44. Specifically, as will appear, the cross-slide member 44 is mounted and guided on base 38 for planar travel along a rectilinear direction line which is transverse to the axis of the spindle; and the workpiece carriage is mounted and guided on the cross-slide member for planar travel along a rectilinear direction line which is substantially at right angles to the transverse direction line. The cross-slide member and carriage are thus connected to one another to travel transversely together, but the carriage travels longitudinally relative to the cross-slide member. Thus the cross-slide member and carriage can be moved transversely by pushing on either one.

Figure 6:
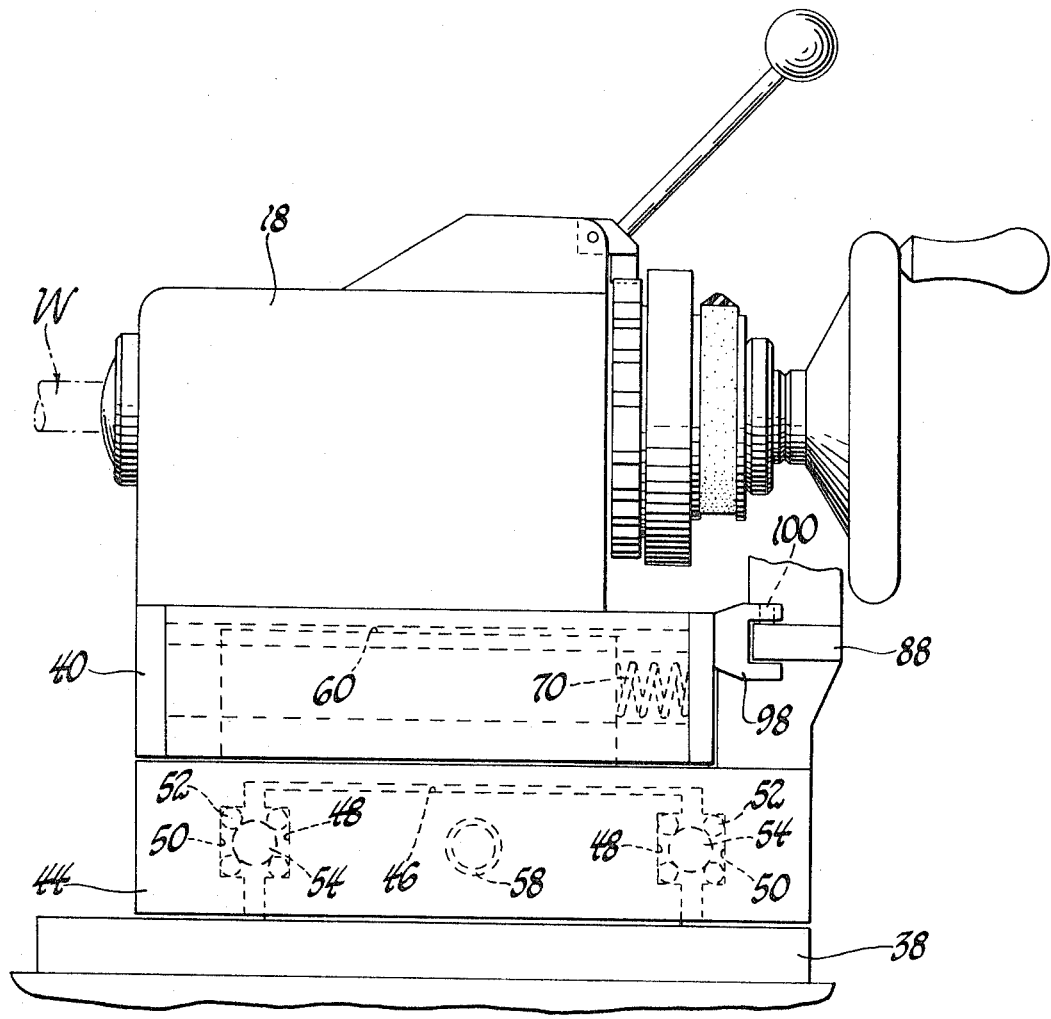
FIG. 6 is a view taken along line 6—6 of FIG. 4.
Figure 2:
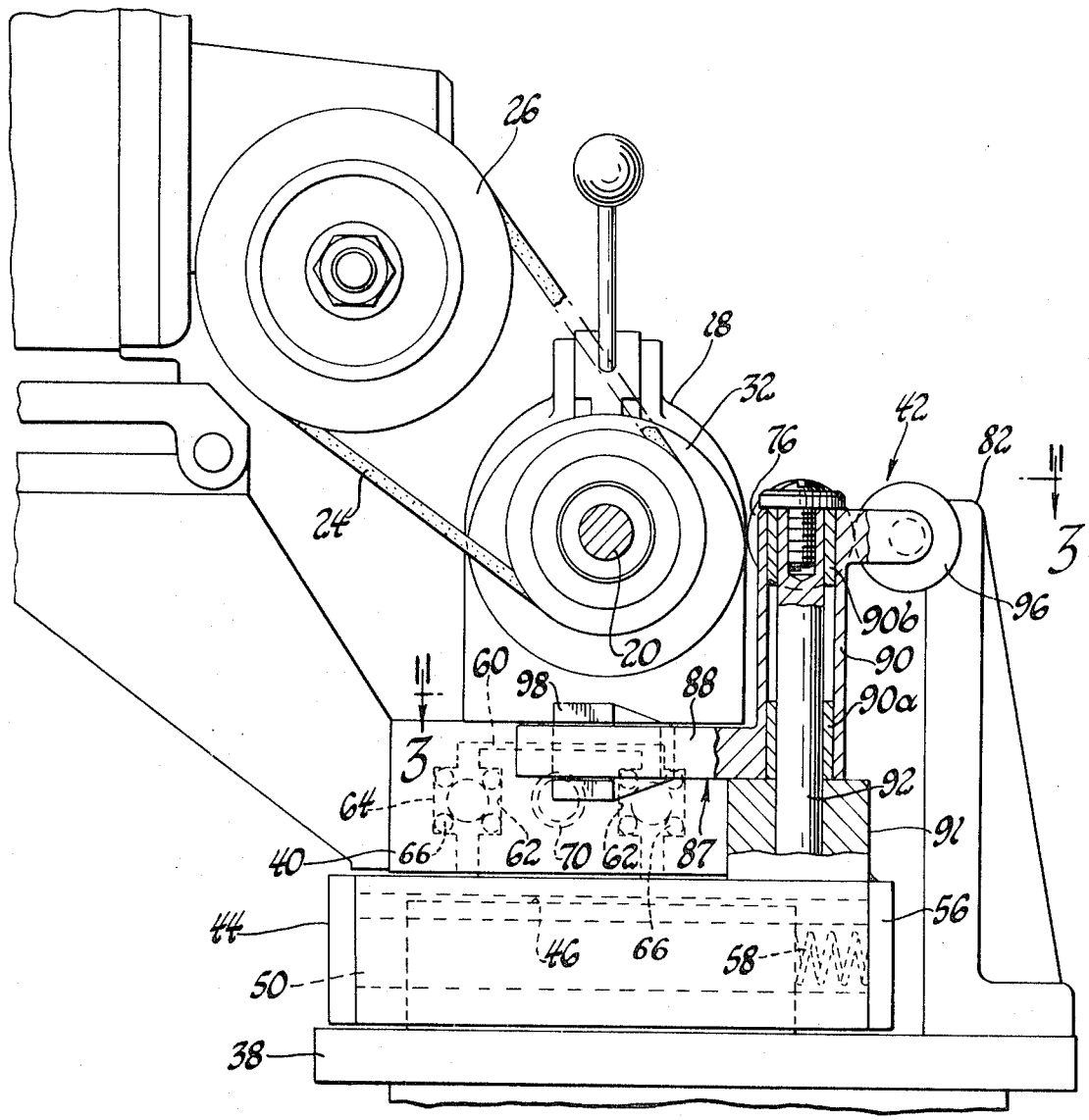
FIG. 2 is an end view of the apparatus of FIG. 1.

With reference primarily to FIG. 6, a support member 46 is fixed to and projects upwardly from the upper surface of base 38 and is formed with tracks or grooves 48 extending along its outer sides. Each groove 48 registers with a groove or track 50 formed on cross-slide member 44. Mounted in each corner of each groove 50, and in each corner of each of the corresponding grooves 48, is an elongated rod 52, and a plurality of ball bearings 54 are received between the four rods 52 so that the slide member 44 is supported for substantially friction-free sliding movement in the direction of the tracks 48, 50 on the base member 38. Interposed between the end of support member 46 and an end plate 56 on slide member 44 is a compression spring 58 (FIG. 2) for biasing slide member 44 toward the right as viewed in FIG. 2, or against movement toward the left as viewed in FIG. 2.

Similarly, a support member 60 is fixed to and projects upwardly from the upper surface of the central portion of slide member 44 and is formed with elongated tracks or grooves 62 (FIG. 2) which cooperate with tracks 64 formed on carriage 40 for receiving a plurality of ball bearings 68 between four corner rods 66 so that the carriage is slidably supported in a relatively friction-free manner on the slide member 44 for movement in a direction transverse to the direction of transverse movement of the cross-slide member 44 relative to base 38 i.e. the carriage travels on the cross-slide member 44 longitudinally of the axis of the spindle. Mounted between the end of walls of support member 60 and carriage 40 is a compression spring 70 which serves to resiliently resist movement of carriage 40 toward the left in FIG. or toward the right in FIG. 4.

Thus, the cross-slide member 44 is mounted on base 38 for rectilinear movement relative to the base along a first or transverse path defined by tracks 48, 50; and carriage 40 is mounted on cross-slide member 44 for rectilinear movement relative to the slide member along a second or longitudinal path defined by tracks 62, 64, which is non-parallel with and transverse or perpendicular to the first path. As will be pointed out below, the actuating means 42 interacts between the base, slide member and carriage and is operable to selectively, (1) reciprocate the cross-slide member 44 along the first path defined along tracks 48, 50 without moving the carriage relative to the slide member, (2) reciprocate the carriage relative to cross-slide member 44 along the second path defined along tracks 62, 64 without moving the slide member relative to the base 38, or (3) simultaneously reciprocate the cross-slide member 44 relative to base 38 and the carriage 40 relative to the slide member. The actuating means 42 includes adjustment means to be described below operable to selectively vary the distance moved by the slide member along the first path and the distance moved by the carriage along the second path.

The actuating means 42 includes a first lever 71 operatively engaging (in this case pivotally connected) at 72 (FIG. 4) with carriage 40 through the spindle housing 18 fixedly mounted on the carriage. It will be seen that the lever is thereby operatively connected to the cross-slide member through the carriage. Lever 71 is slidably received between a pair of ears 74 mounted adjacent the opposite end of the spindle housing 18, and a cam follower in the form of a roller 76 is rotatably mounted on the free end of lever 71. Lever 71 is formed with a slide portion 78 on which is slidably mounted a fulcrum member 80 which can be adjustably secured in any position along the length of lever 71 by a set screw 81. The fulcrum member 80 has a fulcrum point which engages base 38 through an abutment or rail member 82 mounted on base 38 by conventional fasteners 84. The arms of the lever will be seen to extend generally at right angles to the direction of travel of the cross-slide member and carriage on the aforementioned transverse direction line. Thus, rotation of cam 32 about the axis of spindle 20 causes roller 76 to oscillate in the plane of cam 32 as it follows the periphery of cam 32, which oscillation in turn causes lever 71 to rock about fulcrum member 80 and reciprocate carriage 40 along tracks 48 and 50 in a radical or transverse direction with respect to the axis of spindle 20 and workpiece W. Thus, counterclockwise rotation of lever 71 as viewed in FIG. 4 causes carriage 40 and cross-slide member 44 to move away from abutment member 82 along tracks 48, 50, spring 58 maintaining roller 76 in contact with the surface of cam 32. Lever 71 has an adjustable fulcrum 80 for selectively varying the distance moved along the path defined by tracks 48, 50 by cross-slide member 44 and carriage 40. For example, movement of fulcrum member 80 toward pivot 72 decreases the distance moved by carriage 40 and cross-slide member 44 upon pivotal movement of lever 71 about fulcrum member 80 in response to rotation of the cam. Conversely, as fulcrum member 80 is adjusted away from pivot point 72, the distance moved by the carriage member 40 and cross-slide member 44 upon pivotal movement of lever 71 about fulcrum 80 in response to rotation of the cam tends to increase. The lever 71 will be seen to have a first lever arm from the motion receiving element, i.e., follower roller 76, to the adjustable fulcrum 80, and a second lever arm from the fulcrum 80 to the motion transmitting element constituted by the pivot connection 72.

The actuating means 42 is further operable to reciprocate carriage 40 along the path defined by tracks 62, 64 through a second lever 87 having a fulcrum sleeve 90 which is rotatably mounted on a pair of annular spacers 90a and 90b axially received on a fulcrum post 92 projecting upwardly from the cross-slide member 44. Post 92 has its lower end received in a block 91 secured to the upper surface of cross-slide member 44. Lever 87 has a first arm 94 projecting from the upper end of sleeve 90 on which is mounted a motion receiving element made up of a cam follower in the form of a roller 96. Slidably adjustably mounted along the length of a second arm 88 of lever 87, projecting generally transversely of the longitudinal direction of travel of the carriage, from the opposite side of the axis of post 92 and sleeve 90 is an operative motion transmitting member or point 98 which can be secured in any selected position along the length of lever arm 88 between the sleeve 90 and the free end of lever arm 88 as by a set screw 100. This member 98 is shaped and positioned to afford an operative point connection or engagement with the rearward edge 40a of the workpiece carriage 40. This edge 40a is at right angles to the direction of axial travel of the work carriage. It constitutes a rail, along which the motion transmitting point or element is slidable to adjust the lever arm length of the lever 87. Spring 70 (FIG. 6) biases carriage 40 into engagement with member 98 and also biases roller 96 into engagement with roller 76.

Figure 4:
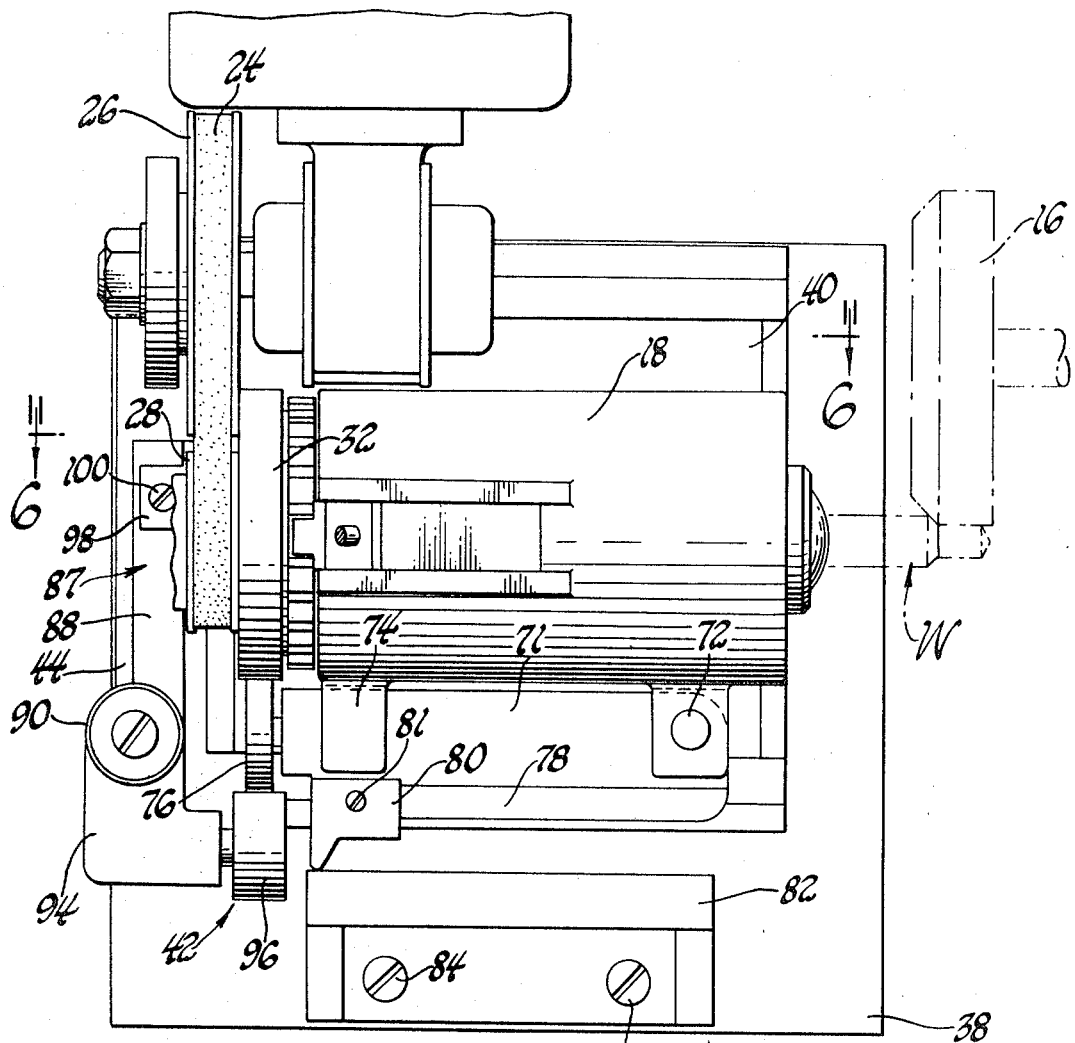
FIG. 4 is a plan view of the apparatus of FIG. 1 taken along line 4—4 of FIG. 1.
Figure 5:
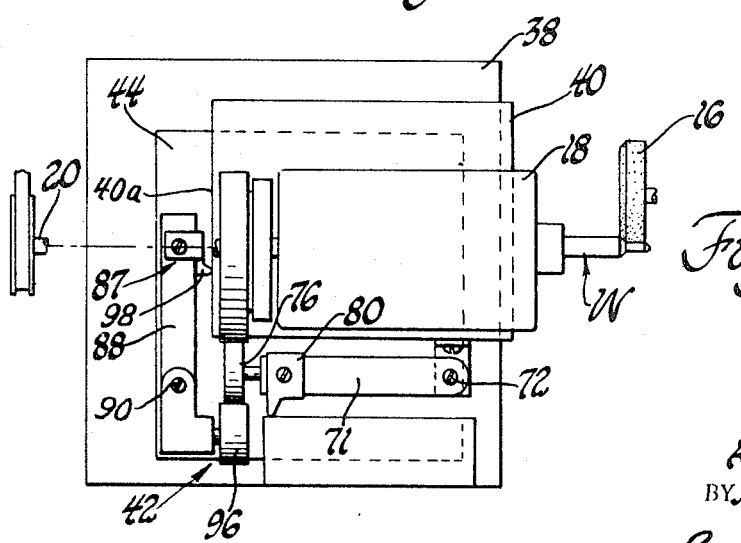
FIG. 5 is a view similar to FIG. 4 with certain parts omitted.

With reference to FIG. 4, as a high portion of cam 32 comes into contact with roller 76, rollers 76 and 96 are thereby caused to move downwardly as viewed in FIG. 4, which in turn causes clockwise rotation of lever arm 88 about the axis of sleeve 90, which movement causes operative engagement or connection member 98 to move carriage 40 to the right as viewed in FIG. 4 along tracks 62, 64. As the cam continues to rotate and roller 76 follows the periphery of the cam to move toward the axis of spindle 20, spring 70 causes the carriage to return to the left to its original position.

The distance moved by carriage 40 is determined by the position of the adjustable fulcrum 98 along the length of the lever arm 88. As member 98 is adjusted toward the free or upper end of lever arm 88 as viewed in FIG. 4, the distance moved by carriage 40 will increase, and conversely as member 98 is moved toward the axis of sleeve 90, the distance moved by carriage 40 upon pivoting of lever 87 will decrease.

Figure 3:
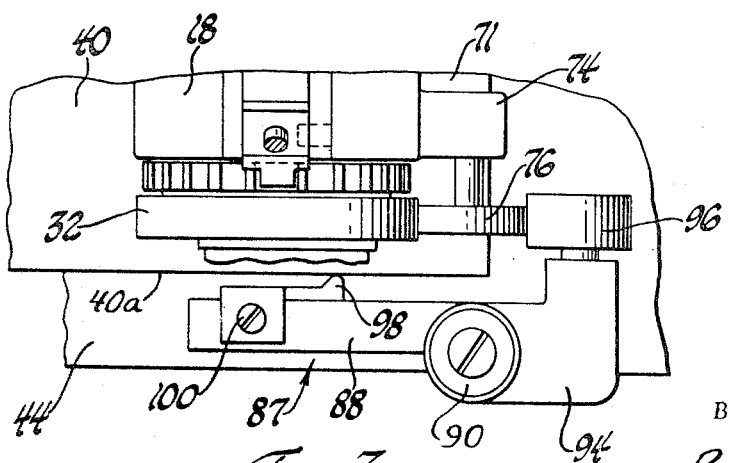
FIG. 3 is a detailed plan view taken along line 3—3 of FIG. 2.

With both levers, movement of the fulcrum member 80, in the first case, and the operative engagement or motion transmitting member 98, in the second, to inactive positions adjacent the respective pivotal axes at 72 and 90, respectively, will substantially deactivate the respective lever such that no movement will be transmitted to the carriage member 40. Thus, to obtain solely axial movement of spindle 20 relative to the grinding wheel 16; that is, reciprocation to the right and left only in FIG. 4, fulcrum member 80 is moved to the right until it engages abutment member 82 at a point in line with pivot 72 so that rocking movement of lever 71 about fulcrum member 80 will transmit no movement to pivot point 72 relative to abutment 82. Similarly, movement of engagement member 98 downwardly in FIG. 4 (to the right in FIG. 3) until said member contacts carriage 40 at a point in line with the axis of sleeve 90 deactivates lever 87 since pivotal movement of the lever about the axis of sleeve 90 will result in no displacement of the fulcrum member 98 relative to the pivotal axis of the lever. Lever 87 thus interacts between cross-slide member 44 and carriage member 40 for reciprocating the carriage along the path defined by tracks 62, 64 relative to the cross-slide member 44.

To relieve the workpiece W illustrated in FIGS. 1a and 1b, the workpiece W is mounted in the spindle so as to rotate with the spindle and is oriented in timed relationship with the cam 32 so that as a high point on the cam comes into contact with roller 76, the trailing edge 8 of the cutting bit will be in contact with the grinding wheel 16. Since the workpiece W has two flutes, a double or two-lobed cam 32 is mounted on the spindle. The amount of radial and axial relief is determined by the position of the fulcrum member 80 and engagement member 98 of levers 71 and 87, respectively along their respective levers. The lever arms serve to multiply the drop of the cam 32 between the high and low points on the periphery of the cam. When the adjustable members 80 and 98 have been locked in their desired positions, rotation of the spindle and cam 32 causes the carriage 40 to reciprocate relative to base 38 in a path lying between the path defined by the tracks 48, 50, and 62, 64 which is the resultant of the amount of movement of cross-slide member 44 relative to base 38 and the amount of movement of carriage member 40 relative to cross-slide member 44. The path of movement of the carriage as well as the distance along the path of movement is thus determined by the position of the adjustable fulcrum 80 and engagement member 98.

Thus, the workpiece supporting carriage 40 is movably mounted on base 38, and the abutment 32 defines a first reaction member, the carriage being movable in a rectilinear path relative to the base 38 and the first reaction member 82; and cross-slide 44 defines a second reaction member, the carriage being movable in a second rectilinear path relative to the base and second reaction member 44, the second path being perpendicular to the first path. The first path is defined by the grooves or tracks 48 and 50, and the second path is defined by the grooves or tracks 62 and 64. A first lever 71 is pivotally engaged at spaced points with the first reaction member and the carriage 40 at 80 and 72, respectively, to cause movement of the carriage in the first path. A second lever 87 is pivotally engaged at spaced points 90, 98 with the second reaction member 44 and carriage 40, respectively, such that pivotal movement of lever 87 causes movement of the carriage in the second path. Lever 71 constitutes first actuating means reacting between reaction member 82 and carriage 40 for moving the carriage in the first path defined by grooves 48, 50, and lever 87 constitutes second actuating means reacting between the cross-slide or reaction member 44 and carriage 40 for moving the carriage along the second path defined by grooves 62 and 64.

The fulcrum member 80 on lever 71 is engaged with the first reaction member 82 and is selectively adjustable along the length of the lever to vary the distance moved along the first path defined by grooves 48, 50 by carriage 40 in response to rotation of cam 32, the fulcrum member 80 being movable to an inactive position adjacent the pivotal connection 72 between lever 71 and carriage 40 such that no movement is transmitted to the carriage by pivotal movement of lever 71. The adjustable motion transmitting point 98 on lever 87 is engaged with carriage 40 and is selectively adjustable along the length thereof to vary the distance moved by the carriage along the path defined by tracks 62 and 64 in response to rotation of cam 32, the point member 98 being movable to an inactive position adjacent the pivotal connection or fulcrum at 90, 92 between lever 87 and the cross-slide or reaction member 44 such that no motion is transmitted to the carriage 40 by pivotal movement of lever 87.

The present invention is therefore embodied in base 38 having the cross-slide member 44 mounted thereon for rectilinear movement relative to base 38 along a first path defined by grooves 48 and 50. Spring 58 biases the cross-slide member 44 against movement in one direction along the first path; and the workpiece supporting carriage 40 is mounted on cross-slide member 44 for rectilinear movement relative to the slide member along a second path defined by grooves 62, 64, the second path being perpendicular to the first path. Spring 70 biases carriage 40 against movement in one direction along the second path. The first lever 71 has one end pivotally connected with the carriage and is fulcrumed intermediate its ends against base 38 with its other end biased by spring 70 to follow the periphery of the rotatable cam 32 mounted on the carriage such that rotation of the cam causes pivotal movement of lever 71 in opposite directions about its fulcrum 80 to reciprocate carriage 40 along the first path. The second lever 87 is pivotally connected intermediate its ends at 90, 92 with the cross-slide 44 and is fulcrumed against the carriage 40 on one side of its pivotal connection at 90, 92 with the cross-slide, the end of lever 87 on the opposite side of the pivot axis of sleeve 90 being biased by spring 58 to follow the periphery of cam 32 such that rotation of the cam causes pivotal movement of lever 87 in opposite directions about its fulcrum member 98 to reciprocate carriage 40 along the second path.

While a specific form of the invention has been illustrated and described in the foregoing specification and accompanying drawings, it should be understood that the invention is not limited to the exact construction shown, but that various alternatives in the construction and arrangement of parts will become apparent to those skilled in the art.

The embodiments of the invention in which an exclusive property or privilege is claimed are defined as follows:

1. In a form relief grinder, the combination of:
   a base,
   a cross slide mounted and guided for planar travel on said base along a predetermined transverse rectilinear path thereacross;
   a workpiece carriage slide mounted and guided for planar travel on the cross-slide along a longitudinal rectilinear path crossing the transverse path, and constrained against displacement along the transverse path relatively to the cross slide;
   a first lever having a fulcrum and two lever arms, including a first lever arm having a motion receiving element spaced from said fulcrum and a second lever arm having a motion transmitting element at an adjustable spacing distance from the fulcrum;
   said motion transmitting element being operatively engaged with one of said slides and said fulcrum being engaged with a fixed reaction means on said base, said second layer arm being arranged so that said motion transmitting element thereof travels generally along the direction of said transverse path;
   a second lever having a fulcrum and two lever arms, including a first lever arm having a motion receiving element spaced from said fulcrum and a second lever arm having a motion transmitting element at an adjustable spacing distance from the fulcrum;
   said motion transmitting element of said second lever being operatively engaged with the workpiece carriage slide, and said fulcrum being engaged with a reaction means on said cross slide, said second lever being so arranged that said motion transmitting element thereof travels generally along the direction of said longitudinal path;
   cam operated means for oscillating said levers through the motion receiving elements on the first lever arms thereof; and
   selector means for each of said levers for regulating the spacing distance between its fulcrum and the motion transmitting element on the second lever arm thereof throughout a distance range from zero to a predetermined maximum.

2. The subject matter of claim 1 wherein:
   the selector means for at least one of the levers includes means mounting the fulcrum for said lever for movement throughout a range of positions along said second lever arm thereof including a position aligned with said motion transmitting element thereof at which the second lever arm length is reduced effectively to zero, and
   the reaction means engaged by said fulcrum for said one lever comprising a rail fixed perpendicularly to the path of travel of the slide engaged by said motion transmitting means of said one lever, with said fulcrum in sliding engagement with said rail for travel throughout its range of positions.

3. The subject matter of claim 1 wherein:
   the selector means for said first lever includes means mounting the fulcrum for said lever for movement throughout a range of positions along said second lever arm thereof including a position aligned with said motion transmitting element thereof at which the second lever arm length is reduced effectively to zero, and
   the reaction means engaged by said fulcrum for said first lever comprising a rail fixed to said base perpendicularly to said transverse path, and said fulcrum being in sliding engagement with said rail for travel throughout said range of positions.

4. The subject matter of claim 3, wherein the cam means for oscillating said first lever is mounted on said workpiece carriage slide, and said motion transmitting element on said second lever arm of said first lever is pivotally connected to said workpiece carriage slide.

5. The subject matter of claim 1 wherein:
   the selector means for at least one of the levers includes means mounting the motion transmitting element for said lever for movement along said second lever arm thereof throughout a range of positions, including a position aligned with said fulcrum at which said second lever arm length is reduced effectively to zero, and
   the portion of the slide engaged by said motion transmitting element of said one lever comprising a rail disposed perpendicularly to the path of travel of the last mentioned slide with said last mentioned motion transmitting element of said second lever arm in sliding engagement with said rail throughout said range of positions.

6. The subject matter of claim 1, wherein:
   the selector means for said second lever includes means mounting the motion transmitting element for said lever for movement along said second lever arm thereof throughout a range of positions, including a position aligned with said fulcrum at which said second lever arm length is reduced effectively to zero, and
   the portion of the slide engaged by said motion transmitting element of said second lever comprising a rail on said workpiece carriage slide disposed perpendicularly to said longitudinal path of travel, with said last mentioned motion transmitting element of said second lever arm in sliding engagement with said rail throughout said range of positions.

7. The subject matter of claim 1, wherein said cam means comprises a single power operated rotary cam driving the motion receiving elements on the first lever arms of both of said levers.

8. The subject matter of claim 7, wherein said rotary cam is mounted on said workpiece carriage slide, and the motion receiving elements on the first lever arms of both of said levers are driven from said single cam.

9. The subject matter of claim 1, wherein said cam means is mounted on said workpiece carriage slide.

10. The subject matter of claim 1, wherein:
    said first lever lies generally alongside said workpiece carriage slide and has its motion transmitting element at its forward end, the fulcrum of said lever includes a body longitudinally adjustable along said lever for adjustment of the distance between its motion transmitting element and the fulcrum, said fulcrum being engageable with said rail on said base and being slidable therealong for said longitudinal adjustment, said cam means comprises a rotary power driven cam on said workpiece carriage slide, and a rotatable follower roller positioned in engagement with said cam constituting said motion receiving element of said first lever.

11. The subject matter of claim 10, wherein the motion transmitting element of said first lever comprises a pivotal connection to said workpiece carriage slide.

12. The subject matter of claim 1, wherein:
    said second lever lies generally alongside the rearward end of said workpiece carriage slide, the fulcrum for said second lever is supported by cross slide, said cam means comprises a rotary power driven cam on said workpiece carriage slide operating the motion receiving end of said first arm of said second lever, the portion of said workpiece carriage slide operatively engaged by the motion transmitting element on the second arm of said second lever comprising a rearwardly located rail on said workpiece carriage slide disposed perpendicularly to said longitudinal path of travel, and said motion transmitting element of said second lever being adjustably movable along said second lever arm of said second lever in sliding engagement with said rail.

13. The subject matter of claim 7 wherein:
said rotary cam and follower roller being on axes substantially parallel to said longitudinal path of travel, said second lever lying generally alongside the rearward end of said workpiece carriage slide, the fulcrum for said second lever being supported by said cross slide, the motion receiving element on the first arm of said second lever comprising a roller engaging said follower roller of said first arm of said first lever, the portion of said workpiece carriage slide operatively engaged by the motion transmitting element on the second arm of said second lever comprising a rearwardly located rail on said workpiece carriage slide disposed perpendicularly to said longitudinal path of travel, and said motion transmitting element of said second lever being adjustably movable along said second lever arm of said second lever in sliding engagement with said rail.

References Cited

UNITED STATES PATENTS

| | | | |
|---|---|---|---|
| 3,279,128 | 10/1966 | Hemlin | 51—232 |
| 2,764,855 | 10/1956 | Dawson | 51—225X |
| 2,471,539 | 5/1949 | Parker | 51—232 |

FOREIGN PATENTS

| | | | |
|---|---|---|---|
| 288,624 | 11/1915 | Germany | 51—225 |
| 693,689 | 7/1953 | Great Britain | 51—225 |

HAROLD D. WHITEHEAD, Primary Examiner

U.S. Cl. X.R.

51—232